United States Patent
Stammberger et al.

(10) Patent No.: US 11,633,791 B2
(45) Date of Patent: *Apr. 25, 2023

(54) APPARATUS FOR ADDITIVE MANUFACTURING OF THREE-DIMENSIONAL OBJECTS

(71) Applicant: Concept Laser GmbH, Lichtenfels (DE)

(72) Inventors: Jens Stammberger, Rodental (DE); Alexander Hofmann, Weismain (DE); Daniel Winiarski, Bad Staffelstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 202 days.

This patent is subject to a terminal disclaimer.

(21) Appl. No.: 17/069,119

(22) Filed: Oct. 13, 2020

(65) Prior Publication Data

US 2021/0039165 A1 Feb. 11, 2021

Related U.S. Application Data

(63) Continuation of application No. 16/145,384, filed on Sep. 28, 2018, now Pat. No. 10,882,113, which is a (Continued)

(30) Foreign Application Priority Data

Nov. 14, 2016 (DE) .......................... 102016121802.2

(51) Int. Cl.
*B22F 12/00* (2021.01)
*B29C 64/153* (2017.01)
(Continued)

(52) U.S. Cl.
CPC .............. *B22F 12/00* (2021.01); *B22F 10/00* (2021.01); *B29C 64/153* (2017.08);
(Continued)

(58) Field of Classification Search
CPC ........... B22F 3/1055; B22F 2003/1056; B29C 64/227; B29C 64/205; B29C 64/255;
(Continued)

(56) References Cited

U.S. PATENT DOCUMENTS 9,808,864 B2   11/2017  Kawada et al.
9,855,706 B2   1/2018   Din et al.
2015/0314389 A1 11/2015 Yamada

FOREIGN PATENT DOCUMENTS

CN    101850615 A    10/2010
CN    203992398 U    12/2014
(Continued)

OTHER PUBLICATIONS

Chinese Office Action Corresponding to CN201710729558 dated Jun. 20, 2019.
(Continued)

*Primary Examiner* — Joseph S Del Sole
*Assistant Examiner* — Jamel M Nelson
(74) *Attorney, Agent, or Firm* — Dority & Manning, P.A.

(57) ABSTRACT

An additive manufacturing apparatus may include a process chamber, a coating device, a shielding device, and a guiding device. The process chamber may include first and second working plane areas. The first working plane area may include a construction plane, and the second working plane area may house at least a part of the guiding device. The coating device may include a coating element assembly group that is, movably supported relative to the construction plane by the guiding device, and at least one coating element configured to form construction material layers in the con-
(Continued)

struction plane. The shielding device may shield the second working plane area from intrusion of construction material or impurities from the first working plane area. The shielding device may include a shielding band, and the shielding band may be coupled for movement with the coating element assembly group. The shielding band may be guided movably along a plurality of supporting points that define an interior region of the second working plane area, and the guiding device may be arranged or formed above the first working plane area.

20 Claims, 2 Drawing Sheets

Related U.S. Application Data continuation of application No. 15/812,959, filed on Nov. 14, 2017, now Pat. No. 10,118,225.

(51) Int. Cl.
| | |
|---|---|
| B33Y 30/00 | (2015.01) |
| B29C 64/255 | (2017.01) |
| B29C 64/205 | (2017.01) |
| B29C 64/227 | (2017.01) |
| B22F 10/00 | (2021.01) |
| B22F 10/10 | (2021.01) |

(52) U.S. Cl.
CPC .......... *B29C 64/205* (2017.08); *B29C 64/227* (2017.08); *B29C 64/255* (2017.08); *B33Y 30/00* (2014.12); *B22F 10/10* (2021.01)

(58) Field of Classification Search
CPC ....... B29C 64/153; B33Y 30/00; B33Y 40/00; B33Y 10/00; C04B 35/622
See application file for complete search history.

(56) References Cited

FOREIGN PATENT DOCUMENTS

| DE | 29701279 U1 | 5/1997 | | |
|---|---|---|---|---|
| DE | 10117875 C1 | 1/2003 | | |
| DE | 102012012413 A1 | 1/2014 | | |
| DE | 102012014841 A1 | 1/2014 | | |
| DE | 102012012412 A1 | 3/2014 | | |
| DE | 102014010929 A1 | 1/2016 | | |
| EP | 3053730 A5 | 8/2016 | | |
| EP | 3053730 B1 * | 2/2019 | ................ | B22F 3/03 |
| JP | H06155589 A2 | 6/1994 | | |
| JP | H06206982 A | 7/1994 | | |
| JP | 2003/080131 A | 3/2003 | | |
| JP | 2004/175093 A | 6/2004 | | |
| WO | WO2007/010598 A1 | 1/2007 | | |
| WO | WO2016/082036 A4 | 6/2016 | | |

OTHER PUBLICATIONS

European Search Report Corresponding to EP17178616 dated Feb. 5, 2018.
European Search Report Corresponding to EP18195175 dated Nov. 27, 2018.
German Search Report Corresponding to DE102016121802 dated Aug. 2, 2018.
Japanese Office Action Corresponding to JP 2017199116 dated Nov. 12, 2018.
Japanese Office Action Corresponding to JP2017199116 dated Aug. 19, 2019.
EOS, Laser-Sinter System für Kunststoffpulver, EOSINT P700 Servicehandbuch, May 2006, pp. 1-94.
EOS, Plastic laser-sintering system for the direct manufacture of end products, spare parts, functional prototypes and patterns for investment or vacuum casting, EOSINT P700, Jan. 2008, pp. 1-2.
Gerbhardt, Generative Fertigungscerfahren, Rapid Prototyping-Rapid Tooling-Rapid Manufacturing, 3rd Edition, Munich, 2007, pp. 120-121 and pp. 136-137.
Wohlers Associates, About the Report, Rapid Prototyping & Tooling State of the Industry Annual Worldwide Progress Report, Wohlers Report 2002, 2 Pages.
Wohlers T., Rapid Prototyping & Tooling State of the Industry Annual Worldwide Progress Report, Wohlers Report 2002, pp. 92-94.
Wohlers Associates, Wohlers Report 2002 Uncovers Exciting Developments, Disappointing Growth, Press Release, Cincinnati, OH, Apr. 30, 2002, pp. 1-4.
"Numerical Control Generation", Case Set (Logistics Technology and Equipment Volume), China Mechanical Engineering Society, Logistics Engineering Branch, China Science and Technology Publishing House, Oct. 31, 2016, p. 262.

* cited by examiner

APPARATUS FOR ADDITIVE MANUFACTURING OF THREE-DIMENSIONAL OBJECTS

CROSS-REFERENCE TO RELATED APPLICATIONS

This application is a continuation of U.S. application Ser. No. 16/145,384, filed Sep. 28, 2018, which is a continuation of U.S. application Ser. No. 15/812,959, filed Nov. 14, 2017, now U.S. Pat. No. 10,118,225, which claims priority to German Patent Application Serial No. 102016121802.2, filed Nov. 14, 2016, the contents of each of which are incorporated herein by reference in their entirety as if set forth verbatim.

BRIEF DESCRIPTION OF THE DRAWINGS

Exemplary embodiments of the present disclosure are described with reference to the Figures, in which.

DETAILED DESCRIPTION

Figure 1:
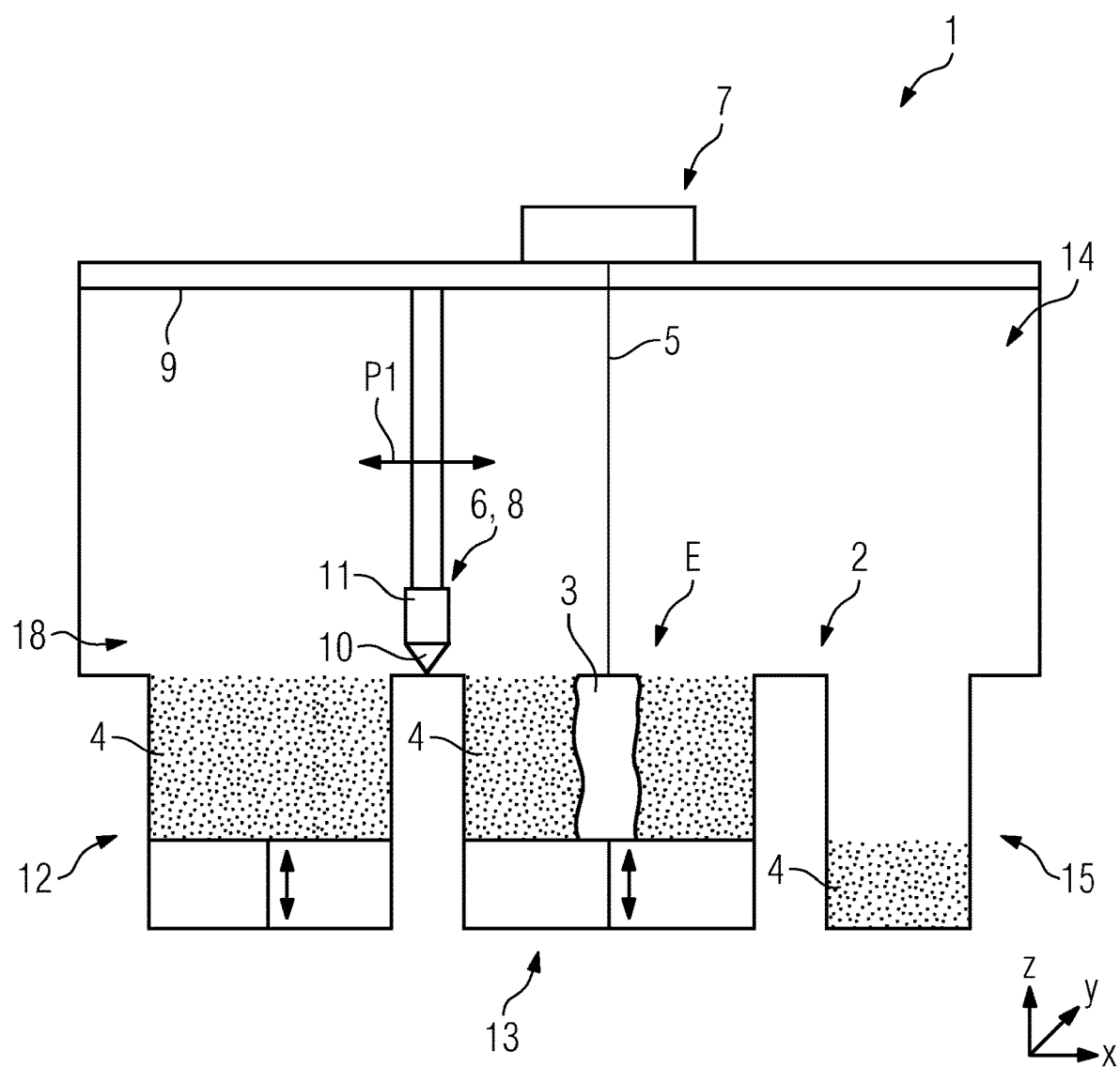
FIG. 1 shows a schematic diagram of an apparatus according to an exemplary embodiment.

The present disclosure relates to an apparatus for additive manufacturing of three-dimensional objects by successive, selective layer-by-layer exposure and thus successive, selective layer-by-layer solidification of construction material layers of construction material that can be solidified by means of an energy beam.

Such apparatuses for additive manufacturing of three-dimensional objects are actually known. By means of respective apparatuses, three-dimensional objects to be manufactured are constructed additively from construction material that can be solidified by means of an energy beam by successive, selective layer-by-layer exposure and thus successive, selective layer-by-layer solidification of construction material layers in the areas corresponding to the layer-related cross-section of the object to be manufactured.

It is known that, especially movably supported, functional components of respective apparatuses can be soiled by, especially dusty, construction material and/or impurities arising related to the process such as smoke and/or smoulder particles, which might adversely affect their operation.

The measures known so far for shielding respective functional components from the intrusion of construction material and/or impurities arising related to the process require continuous further development.

The present disclosure is therefore based on the object to provide, especially with regard to a reliable measure for shielding respective functional components from the intrusion of construction material and/or impurities arising related to the process, an improved apparatus for additive manufacturing of three-dimensional objects.

The apparatus described herein ("apparatus") is provided for additive manufacturing of three-dimensional objects, i.e., for example, technical components or technical component groups, by successive, selective layer-by-layer exposure and thus successive, selective layer-by-layer solidification of construction material layers of construction material that can be solidified in the areas corresponding to the layer-related cross-section of the object to be manufactured. The construction material can be particulate or powdered metal, plastic, and/or ceramic material. The selective solidification of respective construction material layers to be selectively solidified is performed based on object-related construction data. Respective construction data describe the geometric structural design of the respective object to be manufactured additively and can contain, for example, "sliced" CAD data of the object to be manufactured additively. The apparatus can be formed as an SLM apparatus, i.e., as an apparatus for performing selective laser melting methods (SLM methods), or as an SLS apparatus, i.e., as an apparatus for performing selective laser sintering methods (SLS methods).

The apparatus comprises the functional components typically required to perform additive construction processes, including especially a coating device and an exposure device. The coating device is provided for forming construction material layers to be exposed selectively or to be solidified selectively in a construction plane or construction field of the apparatus in which the successive, selective layer-by-layer exposure and thus the successive, selective layer-by-layer solidification of construction material layers of construction material that can be solidified by means of an energy beam takes place. The exposure device is provided for selectively exposing construction material layers to be solidified selectively in the construction plane of the apparatus.

The coating device comprises a coating element assembly group which comprises at least one coating element. The coating element assembly group is movably supported via a guiding device, especially relative to the construction plane. The guiding device is respectively provided for guiding the coating element assembly group along a defined, especially linear, movement path, especially relative to the construction plane. Concretely, the coating element assembly group can comprise a first coating element in the form of a coating blade element forming a coating blade and a second coating element in the form of a coating arm carrying the coating blade element. The coating arm is typically the coating element of the coating element assembly group via which the coating element assembly group is coupled with the guiding device.

The guiding device can comprise one or more, especially rail-like or rail-shaped, guiding elements provided for, especially linearly, movably supported guiding of the coating element assembly group along an, especially linear, movement axis defined by the guiding elements. The guiding device can furthermore comprise an, especially (electro) motor, drive device provided for generating a driving force which generates an, especially linear, movement of the coating element assembly group along the movement axis.

The exposure device can comprise a beam generation device provided for generating an energy or laser beam, a beam deflection device (scanner device) if necessary, provided for deflecting an energy or laser beam generated by the beam generation device onto an area to be exposed of a construction material layer to be solidified selectively, and diverse optical elements such as filter elements, objective elements, lens elements, etc.

The apparatus comprises a process chamber which comprises a working plane. The working plane comprises a first working plane area and another (or second) working plane area. The first working plane area and the other working plane area can form different subareas of one (single) workplate or by several workplates, arranged spatially distanced if necessary, i.e., by at least one own workplate each.

The first working plane area serves the actual additive manufacturing of three-dimensional objects. The first working plane area therefore comprises the construction plane, i.e., the actual construction field, a metering area if necessary, in which construction material is metered, e.g., from a metering module, by means of the coating device across the construction plane by forming construction material layers to be exposed selectively or to be solidified selectively, and an overflow area if necessary, in which excess construction material is collected, e.g., in an overflow module. Therefore, the actual additive manufacturing of three-dimensional objects takes place in the first working plane area; hence, there is in any case construction material in the first working plane area during operation of the apparatus.

The other working plane area serves the arrangement of at least a part of the coating device. Therefore, at least a part of the coating device is arranged in the other working plane area. Of course, further functional components of the apparatus or parts of further functional components of the apparatus can be arranged in the other working plane area. Therefore, actual additive manufacturing of three-dimensional objects does not take place in the other working plane area; hence, there is typically no construction material in the other working plane area. Instead, especially those components of the coating device are located in the other working plane area that can be soiled by, especially dusty, construction material and/or impurities arising related to the process such as smoke and/or smoulder particles.

The apparatus furthermore comprises a shielding device provided for shielding the second working plane area from the intrusion of construction material and/or impurities arising related to the process into the other working plane area. The shielding device comprises at least one shielding band movably guided along supporting points, i.e., for example, slide or roller bearings. The shielding band is generally a band- or belt-like, hence oblong element which has, due to its dimensions, a shielding effect, i.e., is provided for shielding the other working plane area from the intrusion of construction material and/or impurities arising related to the process into the other working plane area. The shielding band extends longitudinally typically along the first working plane area, especially at least along the construction plane or the section of the first working plane area comprising the construction plane.

The shielding band supported along respective supporting points, i.e., especially stretched across respective supporting points, defines an interior inside which at least the guiding device guiding the coating element assembly group is arranged or formed. The guiding device is thus shielded from the intrusion of construction material and/or impurities arising related to the process or protected from sailings by, especially dusty, construction material and/or impurities arising related to the process such as smoke and/or smoulder particles.

The shielding band which is, as mentioned, movably guided along supporting points is coupled for movement with the also movably supported coating element assembly group. Hence, any movements of the coating element assembly group are (directly) transferred to the shielding band. The coating element assembly group, generally the coating device, therefore represents the drive for movements of the shielding band. It is not necessary to provide a separate drive to realize movements of the shielding band.

The geometric design of the interior defined by the shielding band is (basically) determined by the arrangement of the supporting points along which the shielding band is guided. The shielding band can, for example, be movably guided via at least four supporting points in a square or rectangular arrangement. The supporting points can, for example, be arranged or formed at the (imaginary) corner points of the square or rectangle forming the square or rectangular arrangement, so that a (basically) square or rectangular interior results.

With the described formation and arrangement of the shielding device, a reliable measure for shielding or sealing potentially soiling functional components of the apparatus, i.e., especially the coating device, from the intrusion of construction material and/or impurities arising related to the process and thus an improved apparatus for additive manufacturing of three-dimensional objects is provided.

The shielding device can comprise at least one outer shielding element extending at least sectionally along the outer circumference of the shielding band. A respective outer shielding element can abut to the outer circumference of the shielding band contacting it sectionally so that a movement of the shielding band relative to the outer shielding element results in a stripping effect of the outer shielding element. A respective outer shielding element is hence provided with two functionalities, namely a shielding or sealing functionality on the one hand and a stripping or cleaning functionality on the other hand, which effect stripping of any construction material located on the shielding band and thus cleaning of the shielding band. A respective outer shielding element is typically arranged or formed in the first working plane area.

A respective outer shielding element can comprise at least in an area contacting the outer circumference of the shielding band a stripping section made of elastic material, especially elastomer, felt, or cellular material, e.g., cellular rubber. A respective outer shielding element can be moved subject to force, especially subject to spring force, towards the outer circumference of the shielding band so that even in the case of material removal from the stripping section resulting from the stripping effect, contacting abutment to the outer circumference of the shielding band is always ensured.

The shielding device can comprise at least two outer shielding elements in an opposing arrangement. The outer shielding elements can each be arranged or formed in a deflection area in which the shielding band is deflected via a supporting point from a first extension direction to a second extension direction running at (right) angles to that. Respective outer shielding elements can be arranged or formed on a (lateral) process chamber limitation, especially a (lateral) process chamber wall.

The shielding device can furthermore comprise at least one inner shielding element extending at least sectionally along the inner circumference of the shielding band. A respective inner shielding element can abut to the inner circumference of the shielding band contacting it sectionally so that a movement of the shielding band relative to the inner shielding element results in a stripping effect of the inner shielding element. A respective inner shielding element, too, is hence provided with two functionalities, namely a shielding or sealing functionality on the one hand and a stripping or cleaning functionality on the other hand, which effect stripping of any construction material located on the shielding band and thus cleaning of the shielding band. A respective inner shielding element is typically arranged or formed in the second working plane area.

A respective inner stripping element can extend along the inner circumference of the shielding band between two supporting points along which the shielding band extends.

A respective inner shielding element can be formed as or at least comprise a brush element which comprises several stripping bristles. Respective brush elements can be arranged or formed on a carrying structure associated with the respective inner shielding element, especially angularly inclined relative to the shielding band.

The shielding device can comprise at least two inner shielding elements. A first or upper shielding element can abut to an upper border area of the inner circumference of the shielding band contacting it sectionally, and a second or lower shielding element can abut to a lower border area of the inner circumference of the shielding band contacting it sectionally. With such an arrangement, the described shielding or sealing functionality is improved.

To realize a reliable shielding or sealing effect, a free end of a first outer shielding element facing a free end of a second outer shielding element can be arranged in the range of a first free end of the inner shielding element facing it. A free end of a second outer shielding element facing a free end of the first outer shielding element can be arranged in the range of a second free end of the inner shielding element facing it. The respective outer and inner shielding elements are hence arranged, especially with regard to the longitudinal extension of the shielding band, although arranged in parallel in a staggered manner, series-connected. To improve the shielding or sealing effect, a certain overlapping of outer and inner shielding elements is basically imaginable.

To realize an additional shielding effect from the intrusion of construction material or respective sailings in the area in which a free end of a first outer shielding element facing a free end of a second outer shielding element is arranged in the range of a first free end of the inner shielding element facing it, an injection device for blowing in or injecting, especially inert, gas can be arranged or formed in this area. The injection device comprises at least one, especially nozzle-type, injection element. If the injection device comprises several injection elements, these are typically arranged or formed above and below the upper and lower border area of the shielding band.

This applies analogously to the area in which a free end of the second outer shielding element facing a free end of the first outer shielding element is arranged in the range of a second free end of the inner shielding element facing it. Therefore, in this area, too, an injection device comprising at least one, especially nozzle-type, injection element for blowing in or injecting, especially inert, gas can be arranged or formed. If the injection device comprises several injection elements, these are typically arranged or formed above and below the upper and lower border area of the shielding band.

To realize the described coupling for movement between the coating element assembly group and the shielding band, the shielding band can have at least one recess, through hole, opening, etc., which is reached through by the coating element assembly group, especially by the coating arm associated with it, at right angles to its longitudinal extension. The coupling for movement between the shielding band and the coating element assembly group is here formed especially by the coating element assembly group reaching through the recess in the shielding band. The recess is typically dimensioned considering the cross-section geometry of the coating element assembly group, especially the coating arm, i.e., especially selected precisely fitting with regard to the cross-section geometry of the coating element assembly group, especially the coating arm, so that passage of construction material through the recess is not possible. If necessary, additional sealing elements can be provided in this area. In this embodiment, the shielding band is a closed design apart from the recess.

To realize the described coupling for movement between the coating element assembly group and the shielding band in an embodiment in which the shielding band is not a closed design, i.e., has two free ends, a first free end of the shielding band can be attached via a first attachment point in a form-locked and/or force-locked and/or adhesively joined manner to the coating element assembly group, especially to the coating aim, and a second free end of the shielding band via a second attachment point of the coating element assembly group, especially the coating arm. The coupling for movement between the shielding band and the coating element assembly group is formed by the attachment of the free ends of the shielding band to the coating element assembly group, especially the coating arm.

The guiding device, i.e., especially respective guiding elements associated with it, can be arranged or formed, especially hanaing, above the working plane. For this purpose, the guiding device can be arranged or formed, e.g., on a process chamber limitation, especially a process chamber wall limiting the process chamber to the side or ceiling. With a respective spatially distanced arrangement of the guiding device in vertical direction from the working plane provides additional protection of the guiding device from sailings.

FIG. 1 shows a schematic diagram of an apparatus 1 according to an exemplary embodiment of the apparatus 1. FIG. 1 only shows the section of the apparatus 1 relevant to explaining the principle described in the following.

Figure 2:
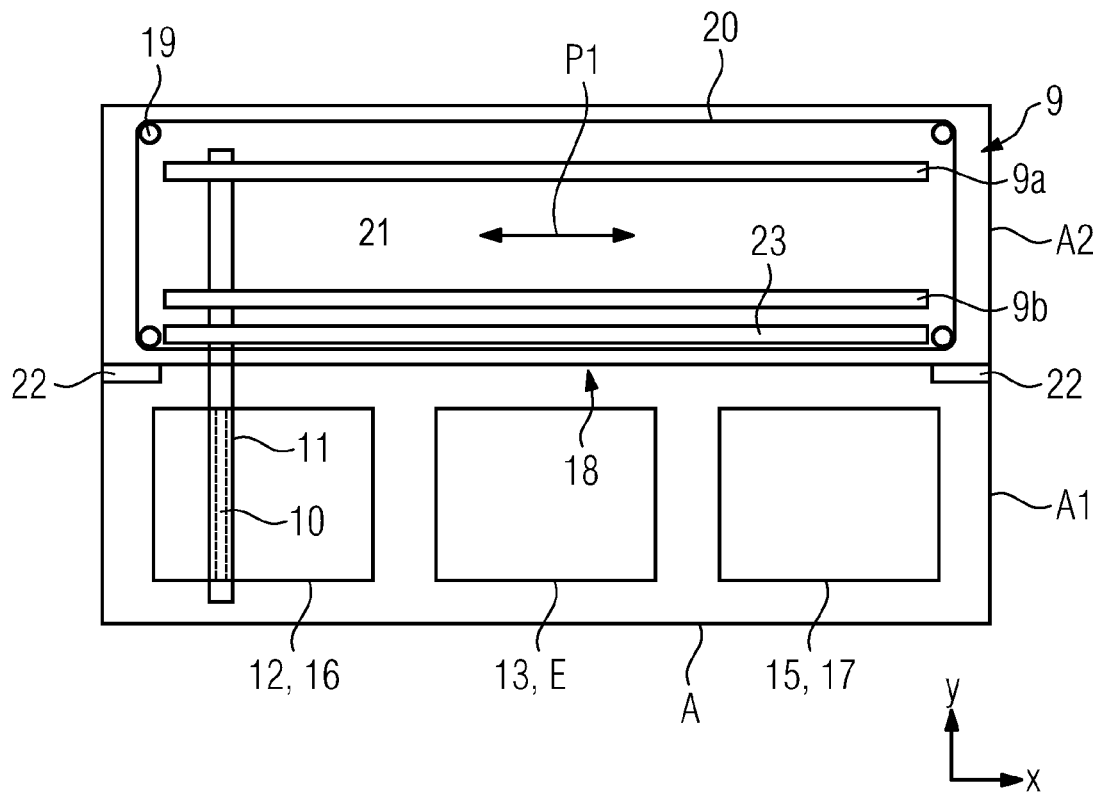
FIGS. 2 and 3 each show a section of the apparatus shown in FIG. 1.
Figure 3:
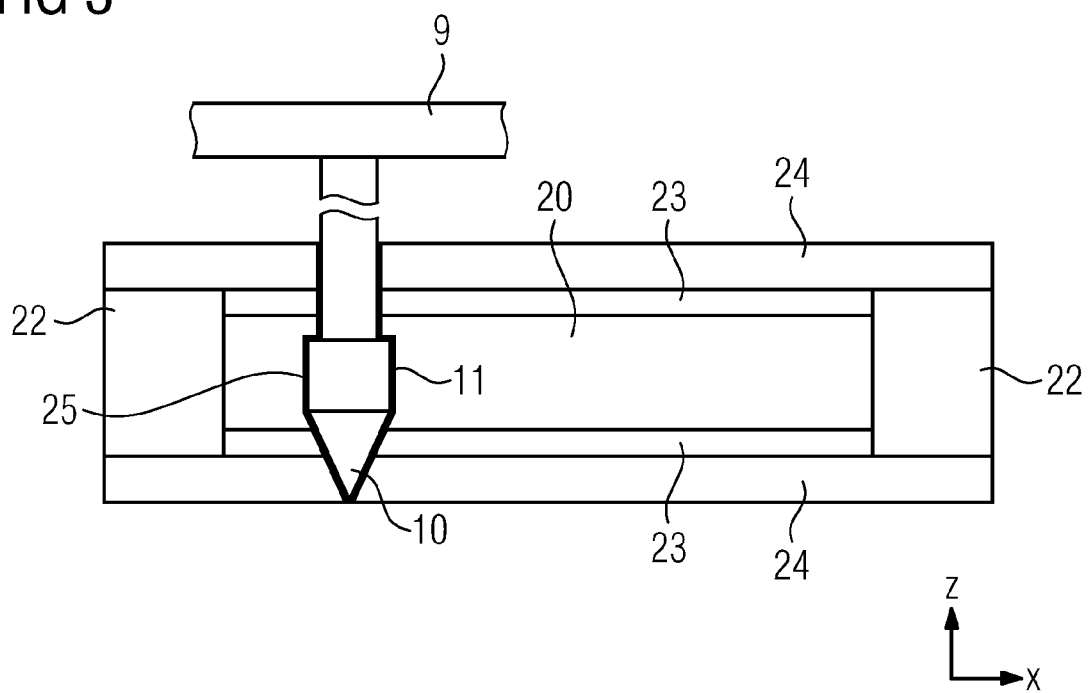

FIG. 2 shows a section of the apparatus 1 shown in FIG. 1 in a top view of the working plane 2 of the apparatus 1 (viewing direction: z axis). FIG. 3 shows a side view (viewing direction: y axis) of a part of the shielding device 3 associated with the apparatus 1.

The apparatus 1 serves the additive manufacturing of three-dimensional objects 3, i.e., especially technical components or technical component groups, by successive, selective layer-by-layer exposure and thus successive, selective layer-by-layer solidification of construction material layers of construction material 5 that can be solidified, i.e., for example, metal powder, by means of an energy or laser beam 5. The selective solidification of respective construction material layers to be solidified is performed based on object-related construction data. Respective construction data describe the geometric or geometric structural design of the respective object 3 to be manufactured additively and can contain, for example, "sliced" CAD data of the object 3 to be manufactured. The apparatus 1 can be formed as a Laser-CUSINGR apparatus, i.e., as an apparatus for performing selective laser melting methods.

The apparatus 1 comprises the functional components required to perform additive construction processes; FIG. 1, for example, shows a coating device 6 and an exposure device 7. The coating device 6 is provided for forming construction material layers to be exposed selectively or to be solidified selectively in a construction plane E or a construction field of the apparatus 1. The exposure device 7 is provided for selectively exposing construction material layers to be solidified selectively in the construction plane E of apparatus 1 and comprises for this purpose a beam generation device (not shown) provided for generating an energy or laser beam, a beam deflection device (not shown) if necessary, provided for deflecting an energy or laser beam generated by the beam generation device onto an area to be exposed of a construction material layer to be solidified selectively, and diverse optical elements such as filter elements, objective elements, lens elements, etc.

The coating device 6 comprises a coating element assembly group 8 which comprises several coating elements. The coating element assembly group 8 is movably supported in horizontal direction, as indicated by the double arrow P1, via a guiding device 9 which is only adumbrated in FIG. 1. The guiding device 9 is respectively provided for guiding the coating element assembly group 8 along a defined linear movement path.

As results especially from FIG. 2, the coating element assembly group 8 comprises a first coating element in the form of a coating blade element 10 forming a coating blade and a second coating element in the form of a coating arm 11 carrying the coating blade element 10. FIG. 2 shows that the coating arm 11 is the coating element of the coating element assembly group 8 via which it is coupled with the guiding device 9.

FIG. 1 furthermore shows a metering module 12, a construction module 13, and an overflow module 15, which are docked to a lower section of a process chamber 14 of the apparatus 1 that can be rendered inert. The mentioned modules can also form a lower section of the process chamber 14 of the apparatus 1.

From FIG. 2 it can be seen that the guiding device 9 comprises several, especially rail-like or rail-shaped, guiding elements 9a, 9b provided for the described guiding of the coating element assembly group 8 along the linear movement axis defined by the guiding elements 9a, 9b. The guiding device 9 furthermore comprises an, especially (electro) motor, drive device (not shown) provided for generating a driving force which generates a movement of the coating element assembly group 8 along the movement axis.

The already mentioned process chamber 14 of the apparatus 1 comprises a working plane A. The working plane A comprises a first working plane area A1 and a second working plane area A2.

From FIG. 2 it can be seen that the first working plane area A1 serves the actual manufacturing of three-dimensional objects 4. The first working plane area A1 comprises the construction plane E, i.e., the actual construction field, a metering area D defined by the metering module 12 in which construction material 5 is metered from the metering module 12 by means of the coating device 6 across the construction plane E by forming construction material layers to be exposed selectively or to be solidified selectively, and an overflow area 17 in which excess construction material 4 is collected in the overflow module 15. Therefore, the actual additive manufacturing of three-dimensional objects 4 takes place in the first working plane area A1.

The second working plane area A2 serves the arrangement of at least a part of the coating device 6. Hence, at least a part of the coating device 6 is arranged in the other working plane area A2. Therefore, actual additive manufacturing of three-dimensional objects 3 does not take place in the second working plane area A2; hence, there is typically no construction material 4 in the other working plane area A2. Instead, especially those components of the coating device 6 or the guiding device 9 are located in the second working plane area A2 that can be soiled by, especially dusty, construction material and/or impurities arising related to the process such as smoke and/or smoulder particles.

To shield the second working plane area A2 from the intrusion of construction material 4 and/or impurities arising related to the process into the second working plane area A2, the apparatus 1 comprises a shielding device 18. The shielding device 18 comprises an oblong shielding band 20 movably guided along supporting points 19, i.e., for example, slide or roller bearings. The closed-design shielding band 20 extends longitudinally and sectionally along the first working plane area A1.

The shielding band 20 defines an interior 21 inside which the guiding device 9 is arranged. The guiding device 9 is thus shielded from the intrusion of construction material 4 and/or impurities arising related to the process or protected from sailings by construction material 4 and/or impurities arising related to the process. In the shown exemplary embodiment, the shielding band 20 is movably-guided via four supporting points 19 in a square or rectangular arrangement. The supporting points 19 are arranged at the (imaginary) corner points of the square or rectangle forming the square or rectangular arrangement so that a (basically) square or rectangular interior 21 results.

The shielding band 20 is coupled for movement with the movably supported coating element assembly group 8. Hence, any movements of the coating element assembly group 8 are (directly) transferred to the shielding band 20. The coating element assembly group 8 therefore represents the drive for movements of the shielding band 20.

The shielding device 18 comprises two outer shielding elements 22, each extending sectionally along the outer circumference of the shielding band 20. The outer shielding elements 22 are arranged in the first working plane area A1. More concretely, the outer shielding elements 22 are each arranged in a deflection area in which the shielding band 20 is deflected via a supporting point 19 from a first extension direction to a second extension direction running at (right) angles to that and are therefore arranged opposite to each other. The outer shielding elements 222 can be arranged on a (lateral) process chamber limitation (not shown), especially a (lateral) process chamber wall.

The outer shielding elements 22 abut to the outer circumference of the shielding band 20 contacting it sectionally so that a movement of the shielding band 20 relative to the outer shielding elements 22 results in a stripping effect of the outer shielding elements 22. The outer shielding elements 22 are hence provided with two functionalities, namely a shielding or sealing functionality on the one hand and a stripping or cleaning functionality on the other hand, which effect stripping of any construction material 4 located on the shielding band 20 and thus cleaning of the shielding band 20.

The outer shielding elements 22 each comprise in an area contacting the outer circumference of the shielding band 20 a stripping section (not denoted in more detail) made of elastic material, especially elastomer, felt, or cellular material, e.g., cellular rubber, and are moved subject to force, especially subject to spring force, towards the outer circumference of the shielding band 20 so that even in the case of material removal from the stripping section resulting from the stripping effect, contacting abutment to the outer circumference of the shielding band 20 is always ensured.

The shielding device 18 furthermore comprises two inner shielding elements 23 extending sectionally, between two (with regard to the first working plane area A1 front) supporting points 19, along the inner circumference of the shielding band 20. The inner shielding elements 23 are arranged in the second working plane area A2. A first or upper shielding element 23 abuts to an upper border area of the inner circumference of the shielding band 20 contacting it sectionally, and a second or lower shielding element 23 abuts to a lower border area of the inner circumference of the shielding band 20 contacting it sectionally.

The inner shielding elements 23 abut to the inner circumference of the shielding band 20 contacting it sectionally so that a movement of the shielding band 20 relative to the inner shielding elements 23 results in a stripping effect of the inner shielding elements 23. The inner shielding elements 23, too, are hence provided with two functionalities, namely a shielding or sealing functionality on the one hand and a stripping or cleaning functionality on the other hand, which effect stripping of any construction material 4 located on the shielding band 20 and thus cleaning of the shielding band 20.

The inner shielding elements 23 are each formed as a brush element which comprises several stripping bristles (not shown). The brush elements are arranged on a carrying structure 24 associated with the respective inner shielding element 23, especially angularly inclined relative to the shielding band 20.

From FIG. 2 it can be seen that a free end of the left outer shielding element 22 facing a free end of the right outer shielding element 22 is arranged in the range of the left free end of the inner shielding element 22 facing it. A free end of the right outer shielding element 22 facing a free end of the left outer shielding element 22 is arranged in the range of the right free end of the inner shielding element 23 facing it. The respective outer and inner shielding elements 22, 23 are hence arranged, especially with regard to the longitudinal extension of the shielding band 20, although arranged in parallel in a staggered manner (in y direction), series-connected (in x direction). To improve the shielding or sealing effect, a certain overlapping of outer and inner shielding elements 22, 23 is basically imaginable.

To realize an additional shielding effect from the intrusion of construction material 4 or respective sailings in the area in which a free end of the left outer shielding element 22 facing a free end of the right outer shielding element 22 is arranged in the range of a left free end of the inner shielding element 23 facing it, an injection device (not shown) for blowing in or injecting, especially inert, gas can be arranged or formed in this area. The injection device comprises at least one, especially nozzle-type, injection element. If the injection device comprises several injection elements, these are typically arranged above and below the upper and lower border area of the shielding band 20.

This applies analogously to the area in which a free end of the right outer shielding element 22 facing a free end of the left outer shielding element 22 is arranged in the range of a right free end of the inner shielding element 23 facing it. Therefore, in this section, too, an injection device (not shown) comprising at least one, especially nozzle-type, injection element for blowing in or injecting, especially inert, gas can be arranged. If the injection device comprises several injection elements, these are typically arranged above and below the upper and lower border area of the shielding band 20.

To realize the described coupling for movement between the coating element assembly group 8 and the shielding band 20, the shielding band 20 has a recess 25 which is reached through by the coating element assembly group 8, i.e., the coating arm 11 associated with it, at right angles to its longitudinal extension. The coupling for movement between the shielding band 20 and the coating element assembly group 8 is formed especially by the coating element assembly group 8 reaching through the recess 25 in the shielding band 20. The recess 25 is dimensioned considering the cross-section geometry of the coating arm 11, i.e., especially selected precisely fitting with regard to the cross-section geometry of the coating arm 11, so that passage of construction material 4 through the recess 25 is not possible. If necessary, additional sealing elements (not shown) can be provided in this area.

Alternatively, it is also possible that the shielding band 20 is not a closed design and has two free ends, wherein a first free end is attached via a first attachment point in a form-locked and/or force-locked and/or adhesively joined manner to the coating arm 11 and a second free end is attached via a second attachment point to the coating arm 11. The coupling for movement between the shielding band 20 and the coating element assembly group 8 is here formed by the attachment of the free ends of the shielding band 20 to the coating arm 11.

The guiding device 9, i.e., especially the guiding elements 9a, 9b associated with it, can be arranged, especially hanging, above the working plane A. For this purpose, the guiding device 9 can be arranged, e.g., on a process chamber limitation (not shown), especially on a process chamber wall limiting the process chamber 14 to the side or ceiling. With a respective spatially distanced arrangement of the guiding device 9 in vertical direction from the working plane A provides additional protection of the guiding device 9 from sailings.

The invention claimed is:

1. An apparatus for additively manufacturing three-dimensional objects, the apparatus comprising:
a process chamber, a coating device, a shielding device, and a guiding device;
wherein the process chamber comprises a first working plane area and a second working plane area, the first working plane area comprising a construction plane, and the second working plane area housing at least a part of the guiding device;
wherein the coating device comprises:
a coating element assembly group that is movably supported relative to the construction plane by the guiding device, and
at least one coating element configured to form construction material layers in the construction plane;
wherein the shielding device is configured to shield the second working plane area from intrusion of construction material or impurities from the first working plane area arising related to operation of the apparatus;
wherein the shielding device comprises a shielding band, wherein the shielding band is coupled for movement with the coating element assembly group; and
wherein the shielding band is configured to be guided movably along a plurality of supporting points that define an interior region of the second working plane area, wherein the guiding device is arranged or formed above the first working plane area.

2. The apparatus of claim 1, wherein the guiding device comprises one or more rail-like guiding elements, the one or more rail-like guiding elements being configured to provide movably supported guiding of the coating element assembly group along a movement axis defined by the one or more rail-like guiding elements.

3. The apparatus of claim 1, wherein the guiding device is suspended above the first working plane area.

4. The apparatus of claim 1, wherein the guiding device is arranged or formed on a process chamber wall, the process chamber wall defining at least a portion of a side of the process chamber and/or at least a portion of a ceiling of the process chamber.

5. The apparatus of claim 1, wherein the guiding device is arranged or formed inside the interior region of the second-working plane area.

6. The apparatus of claim 1, wherein the shielding device comprises one or more outer shielding elements extending at least sectionally along an outer circumference of the shielding band, wherein the one or more outer shielding elements abut or contact the outer circumference of the shielding band, and wherein a movement of the shielding band relative to the one or more outer shielding elements causes a stripping effect to the one or more outer shielding elements.

7. The apparatus of claim 6, wherein the one or more outer shielding elements respectively comprise a shielding band stripping section located at least in an area contacting the outer circumference of the shielding band, wherein the shielding band stripping section comprise an elastomeric material, a felt material and/or a cellular material.

8. The apparatus of claim 6, wherein the one or more outer shielding elements are movable, when subjected to a movement force, towards the outer circumference of the shielding band.

9. The apparatus of claim 6, wherein the one or more outer shielding elements comprise a first outer shielding element disposed at a first end of the shielding device and a second outer shielding element disposed at a second end of the shielding device.

10. The apparatus of claim 9, wherein the first outer shielding element is disposed adjacent to a first one of the plurality of supporting points, and wherein the second outer shielding element is disposed adjacent to a second one of the plurality of supporting points.

11. The apparatus of claim 9, wherein the first outer shielding element and the second outer shielding element are arranged in parallel with respect to a longitudinal extension of the shielding band.

12. The apparatus of claim 9, wherein the shielding device comprises one or more inner shielding elements extending at least sectionally along an inner circumference of the shielding band, wherein the one or more inner shielding elements abut or contact the inner circumference of the shielding band, and wherein a movement of the shielding band relative to the one or more inner shielding elements causes a stripping effect to the one or more inner shielding elements.

13. The apparatus of claim 12, wherein the one or more inner shielding elements comprise an inner stripping element that extends along the inner circumference of the shielding band between two of the plurality of supporting points along which the shielding band extends.

14. The apparatus of claim 12, comprising:
a first injection device comprising at least one nozzle-type injection element configured to blow or inject a gas in an area of the first outer shielding element and/or in an area of the one or more inner shielding elements; and/or
a second injection device comprising at least one nozzle-type injection element configured to blow or inject a gas in an area of the second outer shielding element and/or in an area of the one or more inner shielding elements.

15. The apparatus of claim 12, wherein an inner one or more shielding elements comprises a brush element, the brush element comprising several stripping bristles.

16. The apparatus of claim 1, wherein the coating element assembly group comprises a coating arm element and a coating blade element, the coating arm element being coupled for movement with the guiding device and the coating blade element being arranged on the coating arm.

17. The apparatus of claim 1, wherein the shielding band comprises a recess through which a coating arm of the coating element assembly group extends, and wherein the coating arm extending through the recess of the shielding band provides for the shielding band being coupled for movement with the coating element assembly group.

18. The apparatus of claim 1, wherein at least some of the supporting points define a perimeter of the interior region of the second working plane area.

19. The apparatus of claim 1, wherein the supporting points comprise slide bearings or roller bearings.

20. The apparatus of claim 1, wherein the apparatus is configured to perform selective laser melting.

* * * * *